Figure 22:
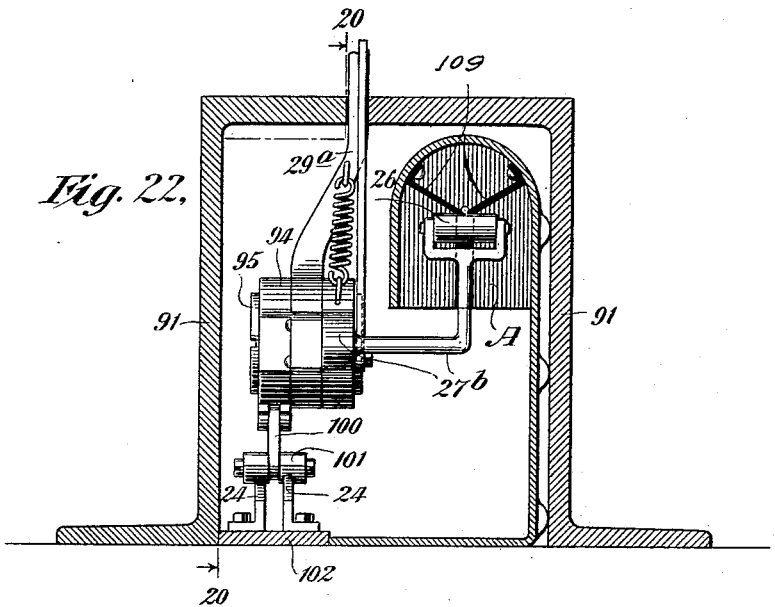

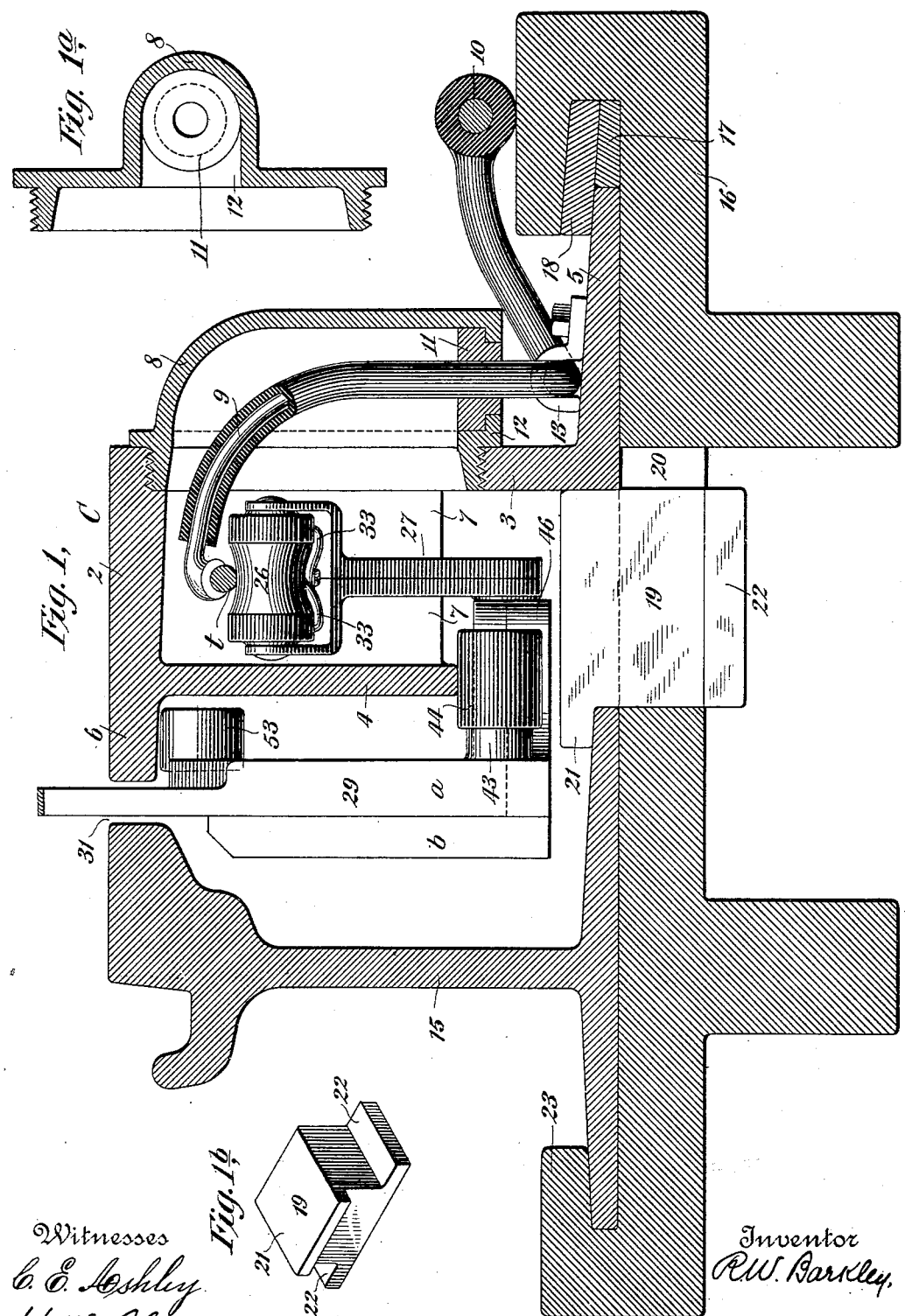

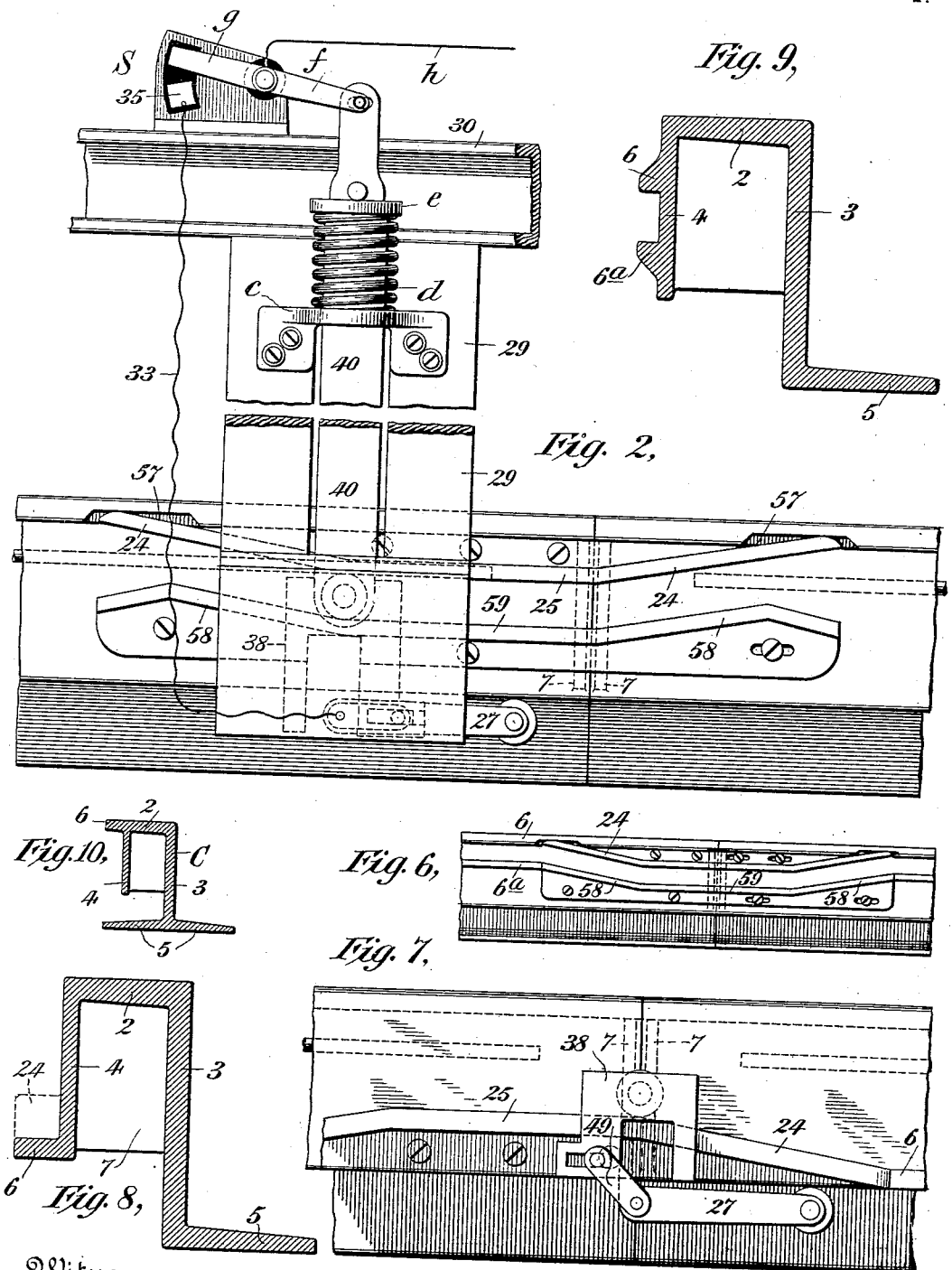

No. 633,558. Patented Sept. 26, 1899.
R. W. BARKLEY.
ELECTRIC RAILWAY.
(Application filed Oct. 23, 1893.)
(No Model.)
7 Sheets—Sheet 3.
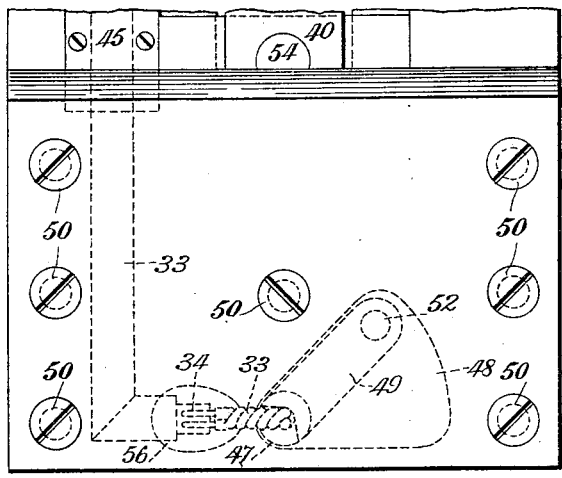
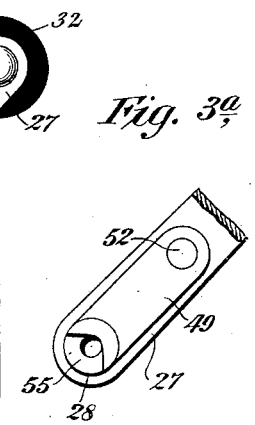
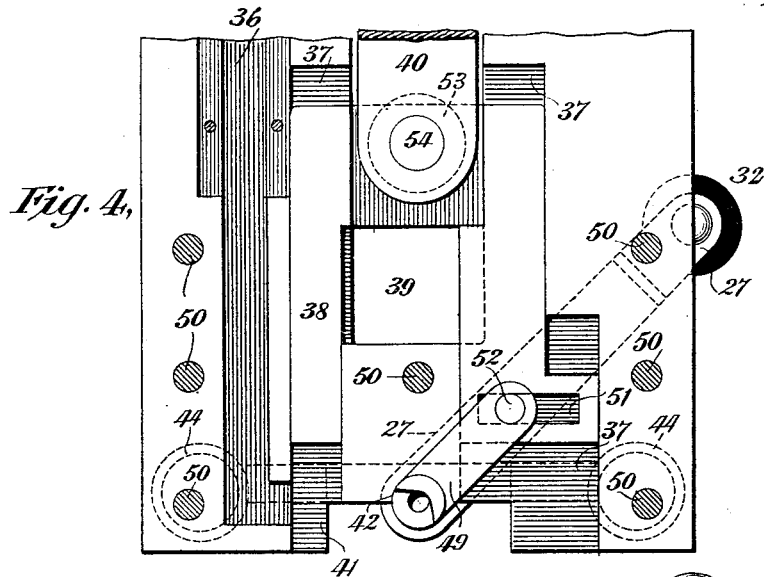
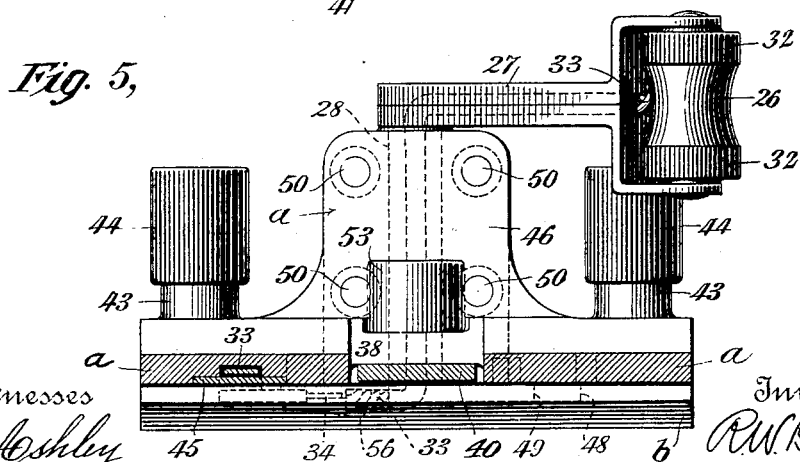
Witnesses
C. E. Ashley
I. H. W. Lloyd
Inventor
R. W. Barkley No. 633,558. Patented Sept. 26, 1899.
R. W. BARKLEY.
ELECTRIC RAILWAY.
(Application filed Oct. 23, 1893.)
(No Model.) 7 Sheets—Sheet 4.
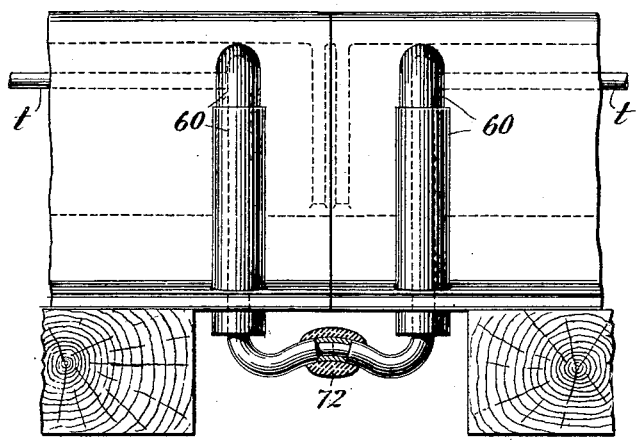
Fig. 11.
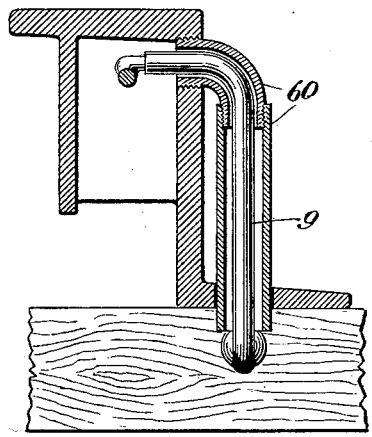
Fig. 12.
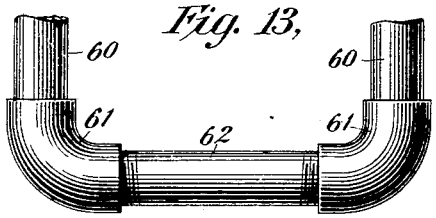
Fig. 13.
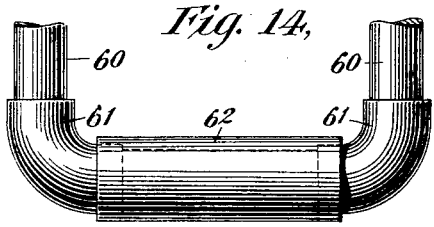
Fig. 14.
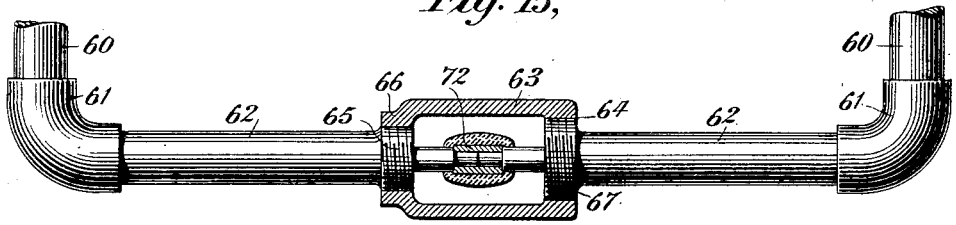
Fig. 15.
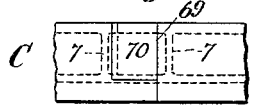
Fig. 16.
Fig. 17.
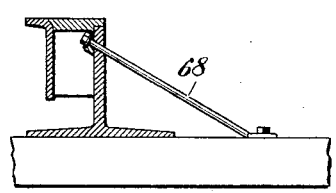
Fig. 18.
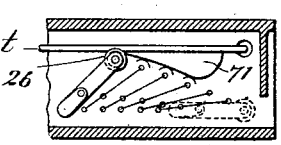
Fig. 19.
Witnesses
C. E. Ashley
H. W. Lloyd
Inventor
R. W. Barkley
THE NORRIS PETERS CO., PHOTO-LITHO., WASHINGTON, D. C.

No. 633,558. Patented Sept. 26, 1899.
R. W. BARKLEY.
ELECTRIC RAILWAY.
(Application filed Oct. 23, 1893.)
(No Model.) 7 Sheets—Sheet 5.
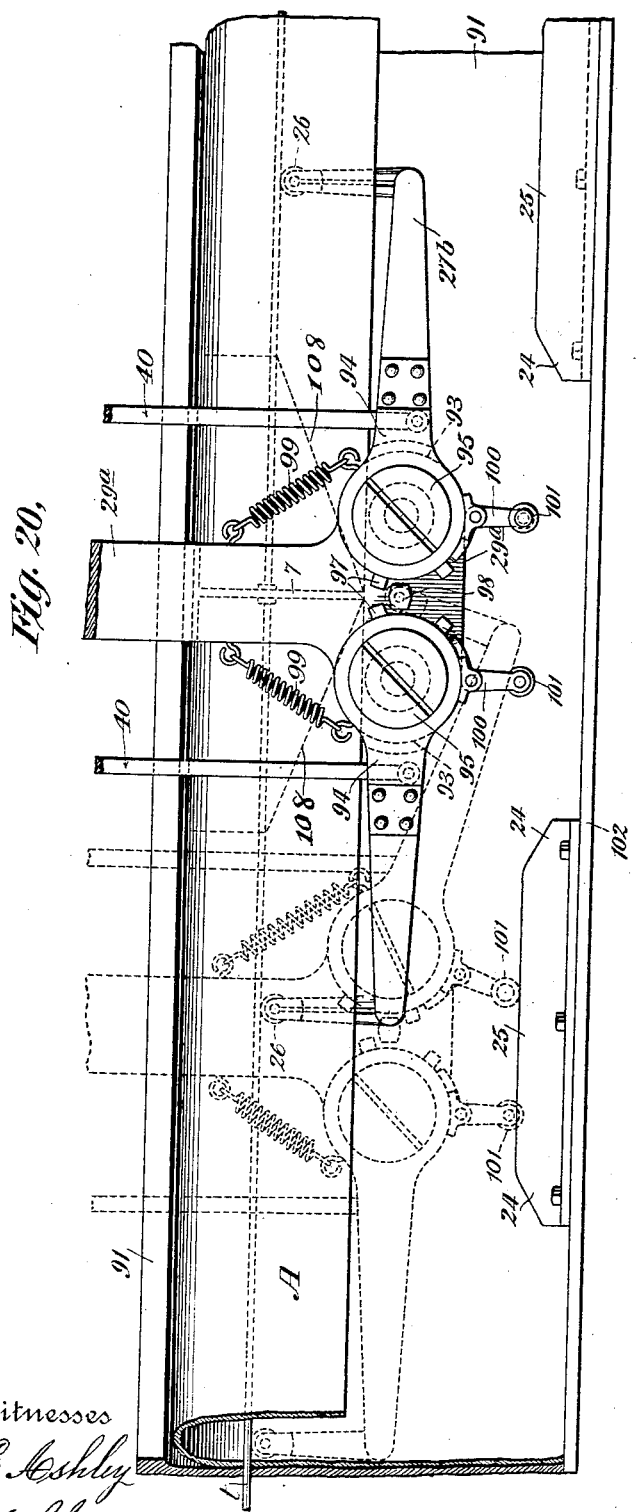
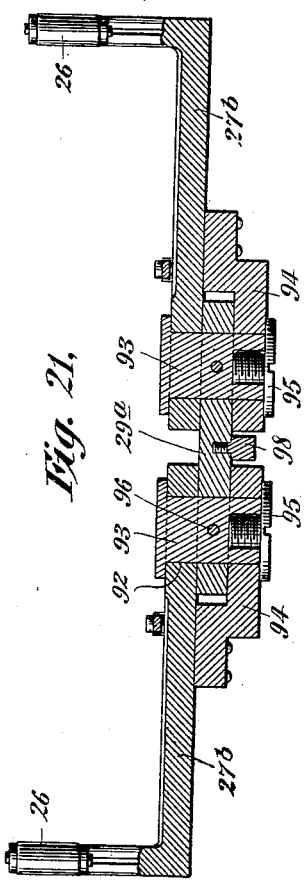
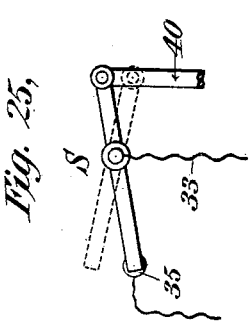
Witnesses
C. E. Ashley
H. W. Lloyd.
Inventor
R. W. Barkley.

No. 633,558. Patented Sept. 26, 1899.
R. W. BARKLEY.
ELECTRIC RAILWAY.
(Application filed Oct. 23, 1893.)
(No Model.) 7 Sheets—Sheet 6.

Witnesses
C. E. Ashley
H. W. Lloyd.

Inventor
R. W. Barkley.

No. 633,558. Patented Sept. 26, 1899.
R. W. BARKLEY.
ELECTRIC RAILWAY.
(Application filed Oct. 23, 1893.)
(No Model.) 7 Sheets—Sheet 7.
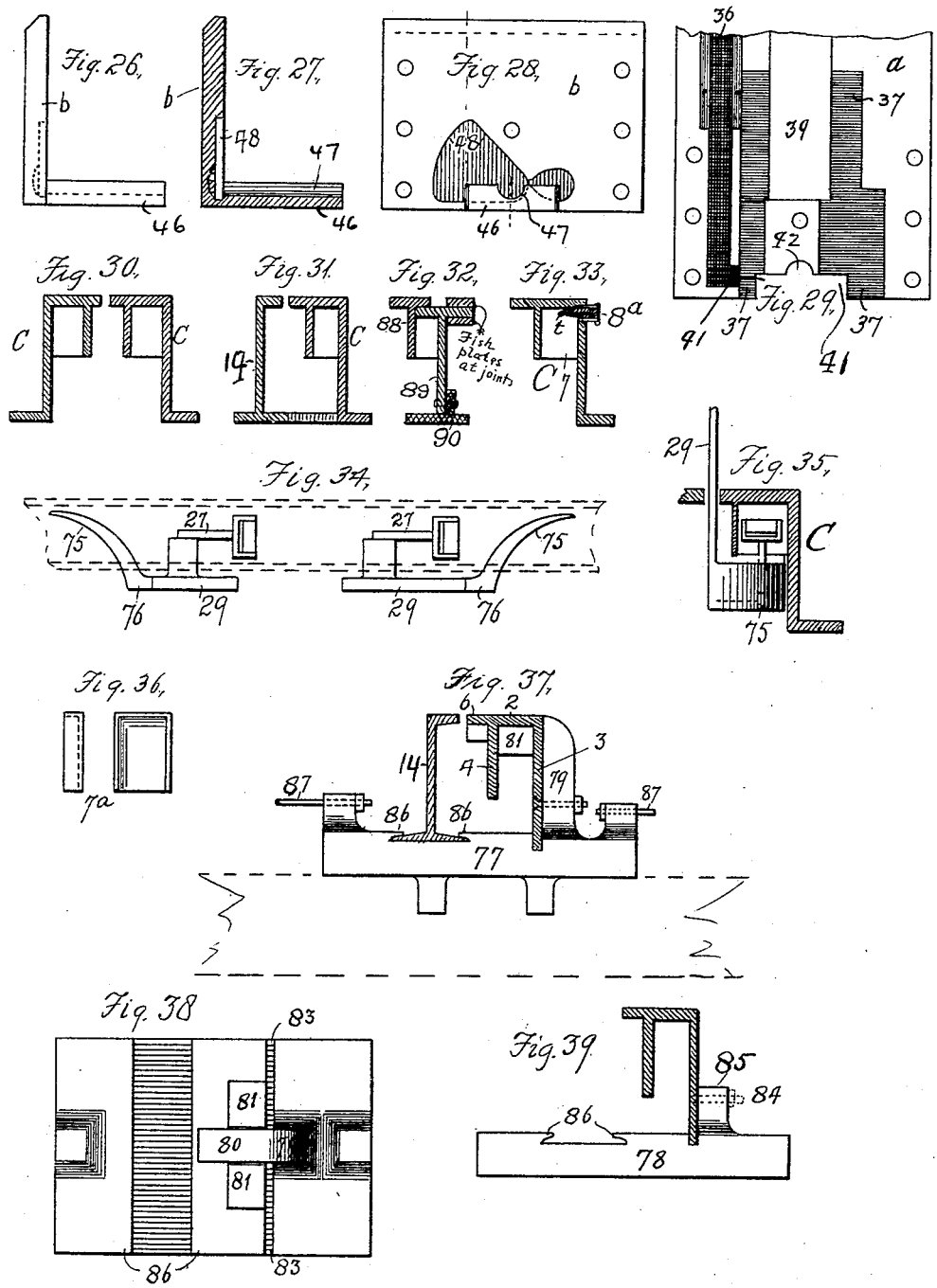

UNITED STATES PATENT OFFICE.

RICHARD W. BARKLEY, OF NEW YORK, N. Y.

ELECTRIC RAILWAY.

SPECIFICATION forming part of Letters Patent No. 633,558, dated September 26, 1899.

Application filed October 23, 1893. Serial No. 488,886. (No model.)

*To all whom it may concern:*

Be it known that I, RICHARD W. BARKLEY, a citizen of the United States, and a resident of the city of New York, in the county of New York and State of New York, have invented certain new and useful Improvements in Air-Chamber Conduits for Electric Railways, of which the following is a specification.

This invention relates to electric railways wherein the vehicles are propelled by power derived from conductors extending along the same, and more particularly to that class of electric railways wherein such conductors are placed in underground conduits and are protected against contact with water, &c., by means of air-chambers, as shown in Letters Patent of the United States bearing date the 14th day of June, 1892, and numbered 476,776.

The objects of the invention are the simplification and cheapening of the conduit construction, the simplification of the devices whereby the electric current is taken to the motors on the vehicles, and other objects, as hereinafter will appear from the description of the invention.

To these ends the invention consists of an air-chamber rail having unequal downwardly-extending webs or flanges joined by a web at the top and having horizontally-extending flanges thereon, of a contact-carrier supported from or by the vehicle and held with its contact-piece or current-collector against the trolley-wire (or other form of conductor) by a spring, combined with cams or inclines placed adjacent the ends of the air-chambers, whereby the collector is moved reciprocatingly into and out of the air-chambers and passes from one to another of the chambers, and of other combinations of devices, all hereinafter described, and more particularly pointed out in the claims concluding this specification.

The invention in some of its forms is shown in the drawings accompanying this specification and forming part hereof, in which—

Figure 23:
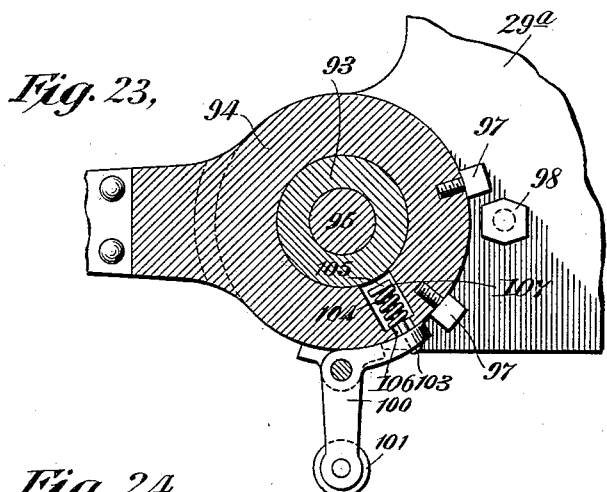
Figure 24:
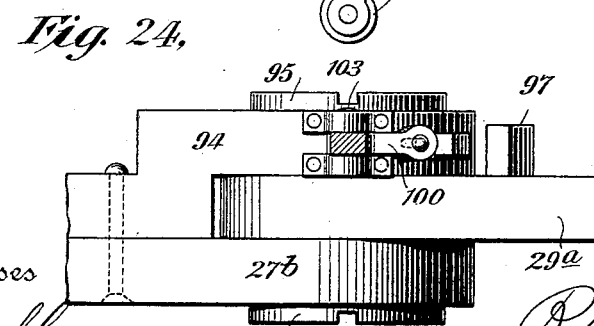

Figure 1 is a cross-sectional view of one form of the conduit, showing also a trolley and its support. Fig. 1ª is a horizontal sectional view of the insulator-holding pocket shown in Fig. 1. Fig. 1ᵇ is a perspective view of the key shown in Fig. 1. Fig. 2 is a side view of the air-chamber rail at a joint thereof, showing a trolley-support and means for operating the trolley or contact-carrier. Fig. 3 is an enlarged view of the lower end of the support shown in the preceding figure, including the trolley. Fig. 4 is a side view of the lower end of one part of the said support and trolley. Fig. 5 is a plan view, partly in section, of the said support and trolley. Fig. 6 is a side view of the junction of two conduit-rails, showing an arrangement of cams for operating the contact-carrier when pointing in either direction. Fig. 7 is a side view, and Fig. 8 is a sectional view, of a modification of the air-chamber rail with a corresponding change in the trolley. Figs. 9 and 10 are sectional views illustrating modifications of the air-chamber rail. Fig. 11 is a side view, and Fig. 12 is a sectional view, of means for running a trolley-wire from one air-chamber to another. Figs. 13, 14, and 15 are views showing forms of a cover for the trolley-wire as it passes from one to another air-chamber. Figs. 16 and 17 are plan views of conduit-rails, showing hand-holes and covers therefor. Fig. 18 is a cross-sectional view of a conduit-rail, showing a brace extending into a hand-hole. Fig. 19 is a longitudinal sectional view showing an incline under a trolley-wire at one end of an air-chamber to ease or prevent the shock between the contact-piece and the wire as the former rises. Fig. 20 is a side view of another form of conduit, showing trolleys and cams to operate the same. Fig. 21 is a horizontal sectional view of the trolleys shown in Fig. 20, and also shows a switch. Fig. 22 is a cross-sectional view of the conduit shown in Fig. 20. Figs. 23 and 24 are details of matters shown in Figs. 20 to 22. Fig. 25 is a view of the switch which is omitted in Fig. 20. Fig. 26 is a side elevation of one of the L-shaped trolley-carriers used in the preferred form of the invention. Fig. 27 is a vertical central section of the same. Fig. 28 is a front elevation of the same, or from the right-hand side in Fig. 26. Fig. 29 is a back view or elevation of the second of the L-shaped pieces or carriers forming the support for the trolley. Fig. 30 is a cross-sectional view of an arrangement of two air-chamber rails at the center of a track. Fig. 31 is a like view showing an air-chamber rail combined with a slot-rail of three-quarter I form. Fig. 32 is a cross-section of a built-up air-chamber rail. Fig. 33 is a sectional view showing a modified form of pocket and insulator held therein. Fig. 34 is a plan view showing conduit-clearers and two trolleys. Fig. 35 is a cross-section of an air-chamber rail, showing the conduit-clearer in end view. Fig. 36 shows two views of a form of conduit or air-chamber end. Fig. 37 is a cross-sectional view of a form of conduit and supports therefor. Fig. 38 is a plan view of the support shown in Fig. 37. Fig. 39 is an edge view of a support for the air-chamber rail at a point between the ends thereof.

Referring more particularly to Figs. 1 to 5, inclusive, the air-chamber rail C consists of the horizontal web 2, the downwardly-extending plates 3 and 4, the horizontal flanges 5 and 6, (the top of flange 6 being flush with that of the web 2,) and bulkheads or partitions 7. This rail C may be supported on ties or yokes, (not shown,) as in street-railways in use. At the ends of the air-chambers and at suitable intervals between the plate 3 is pierced and threaded to receive the pockets 8 for the insulators and the connections between the trolley-wire $t$ or other form of conductor and the feeder or between the chambers. These pockets 8 may be narrow, as indicated in Fig. 1ª, while their threaded parts are circular. The stiff insulated wire 9, shown as supporting the trolley-wire in Fig. 1, is connected with an insulated feeder 10 (which may lie along flange 5 or elsewhere) and preferably is held in place by a ferrule 11, resting on flange 12 of the pocket 8. A cleat 13, bolted to flange 5, holds the wire 9 steady. Such connection 9 to the trolley-wire is required at but one point in each air-chamber. At the other pockets the trolley-wire is preferably supported on insulators. The rail C forms one side of the conduit, while the other side may be formed by a like rail (see Fig. 31) or by a rail 14, as in Fig. 37, or by the track-rail 15, as in Fig. 1, it being understood that the rail C may be on either side of the rail 15 with its flange 6 next it. The rails C and 15 are shown as locked in a shoe 16 in Fig. 1 by wedge 17, lock-bar 18, and key 19. The key 19 passes through the slot 20 in shoe 16, has a lip 21 resting on the flange of rail 15, and two lips 22, which bear underneath shoe 16. This locks the rail 15 down on that side thereof. The lip 23 of the shoe 16 locks the rail 15 down on the other side. The wedge 17 and bar 18 are driven under a lip 23 of the shoe.

Any suitable form of current-collector may be used for coaction with the wire $t$ or other form of conductor. The said current-collector is suitably mounted for reciprocation with relation to the trolley-wire or air-chamber. Such reciprocation is caused by means of inclines or cams, as 24, placed adjacent the bulkheads 7. In those cases where the current-collectors are borne by pivoted arms the cams 24 are or may be provided with a dwell 25 to hold the carriers down until the current-collectors have passed the bulkheads.

Referring to Figs. 1 to 5, the current-collector consists of a wheel 26, which is carried by the arm 27 of the shaft 28. This shaft 28 is journaled in the support 29, depending from a vehicle. (Not shown.) The support 29 is shown as carried by a bar 30, which is or may be loosely mounted on a truck, car-floor, or elsewhere, so as to allow the support to move freely and loosely in the slot 31 after the manner common in the grip mechanism of the so-called "cable-roads." The bar 30 is so supported as to keep the rollers 44 against the plate 4, as hereinafter described. In those cases where the shaft 28 and arm 27 are of metal the wheel 26 is to be insulated therefrom in any suitable way. Insulation 32 is shown in the drawings as separating the wheel 26 from the arm 27; but as trolley-wheels separated from their carriers by insulation are well known in the art it is not necessary to show the details of such old constructions herein.

The conductor 33 is connected with the wheel 26 in any suitable way, preferably lying in a hollow of the arm 27 and in a central bore of the shaft 28, issuing from the latter in an axial line into an opening in the support 29, and is thence led along the support 29 to the vehicle and motor. This axial exit for the conductor allows of the rocking motion of the shaft 28 without any lengthening or shortening of the conductor and without any break in its continuity from the contact-piece 26 to the vehicle or the switch S, hereinafter described. This conductor 33 may be of any suitable form and is shown in the drawings as consisting of twisted insulated wires within the shaft 28 and arm 27 and to the joint 34. From the joint 34 it preferably consists of a thin insulated ribbon extending at least to a point above the slot 31, if not all the way to the contact 35 of the switch S, preferably supported on the bar 30, hereinbefore mentioned. The arm 27 is or may be made up of two parts, one of which is preferably integral with the shaft 28 and the other of which is secured thereto. (See Fig. 5.) One or both said parts of the arm 27 may have a groove for the reception of the conductor 33. The support 29 is preferably made up of two L-shaped pieces of metal, each having a semicylindrical groove in its horizontal arm, the said grooves when the pieces are placed in position forming a bore for the shaft 28. The particular form of the support 29 shown in the drawings comprises the long L-shaped part $a$, carried by bar 30 and having a groove 36 to receive the conductor 33, a groove 37 to receive the slide 38, a slot 39 to receive the rod 40 and part of the slide 38, a transverse groove 41, a semicylindrical transverse groove 42, studs 43 for the rollers 44, and a cover 45 for the conductor 33, and the short L-shaped part $b$, which fits against one side of part $a$ at the bottom thereof and whose horizontal leg 46 fits into the groove 41. The leg 46 is provided with a semicylindrical groove 47 to receive the shaft 28 and part $b$ is recessed, as at 48, to receive the arm 49 of the shaft 28, by means of which the shaft is operated or rocked during the operation of the device, as hereinafter described. This arm 49 may be integral with the shaft 28. The part $b$ fits closely against the end and arm 49 of shaft 28, which is thus held in place. The parts $a$ and $b$ are held together by suitable means, as by screws 50. The slide 38 comprises two legs and a cross-piece joining them. One of the legs has a slot 51 therein, which engages the pin 52 on the arm 49. The slide carries a roller 53 on a stud thereon and has a pin 54, over which the eye of the rod 40 fits. The said eye is held on the pin by the part $b$ of the support 29. The rod 40 is or may be guided on the support 29, as by the perforated bracket $c$. A spring $d$, acting between the bracket $c$ and a collar $e$ on the rod, serves to hold the rod and connected parts in their upper or working position, with the wheel 26 bearing against the trolley-wire $t$. The lever $f g$ of the switch S is connected with the rod 40, as by a slot and pin. The arm $g$ is preferably insulated from the arm $f$ and is connected with the motor (not shown) by a suitable conductor $h$. The function of the switch $f g$ (or S) is to open the circuit from the corresponding trolley to the motor whenever that trolley is depressed or moved down out of contact with the conductor, as wire $t$, as will hereinafter appear in the description of the operation of the devices. While the conductor 33 may pass wholly or partly through the part $b$ after it leaves the shaft 28, it has been shown in the drawings as passing or bending around the end of the shaft in a recess 55, and the part $b$ is shown as having a groove 56 to receive the conductor 33 and the joint 34. By preference the longitudinal hollow of shaft 28 is funnel-shaped where it connects with the recess 55, as this avoids a sharp corner on which the conductor 33 might wear off its insulation. This is a compact way of arranging these parts. The slight motion of the shaft 28 will twist and untwist the wires of conductor 33; but as this is distributed over the whole length (or nearly so) of the shaft no injurious effects will follow.

The cams 24 by preference are borne by the rail C, being secured thereto in any suitable way, as by screws. When these cams are at the junction of two rails, the screws pass through slots in at least one end of the cam to make allowance for the expansion and contraction of the rails. In cases where these cams are fixed to the rail C beneath the guide-flange 6, as in Figs. 2 and 6, the rail is preferably recessed, as at 57, to receive the end of the cam. When the stop or guide flange 6 is at the bottom of the plate 4, the flange 6 is preferably removed where the plate is to receive the cams 24, as in Fig. 7.

By having two or more trolleys 26 on a vehicle and so placed that all cannot be simultaneously depressed a continuous connection between the trolley-wire $t$ and the motor or motors is secured.

Instead of the support 29 being fast to bar 30 and the latter spring-supported the former may be spring-supported on the latter, as shown in the Patent No. 476,776, above named.

In Figs. 6 and 9 is shown a second flange $6^a$, between which and flange 6 the roller 53 is guided.

At the ends of the air-chambers the insulated wire 9 is preferably taken out through the wire-carrier 60, formed of an elbow and a short pipe, (see Figs. 11 and 12,) the former being screwed into a perforation in rail C and the latter passing through a perforation in the flange 5. The wires 9 from adjoining air-chambers may be connected together, as in Figs. 11 and 15, and the joint covered with insulation, as at 72.

In Figs. 13 and 14 are shown forms of an armor for the wires 9 when the latter pass from one to another air-chamber, such armor consisting of elbows 61, pipes 62 connecting the carriers 60 and having the wires 9 within them.

In Fig. 15 is shown another form of armor, consisting of elbows 61 and pipes 62 and 63. The elbows 61 and pipes 62 63 are connected by screw-threads in well-known ways. The pipe 63 is large enough at 64 to slip over the pipe 62 and its threaded end 65. The threaded ends 64 66 of pipe 63 engage the threaded ends 65 67 of pipes 62, as shown.

The rail C may be braced or connected with the ties at suitable intervals by rods 68, which pass through the plate 3 in reach of hand-holes 69, (as beneath them,) which have covers 70. (See Figs. 16, 17, and 18.)

Where conditions permit of its use, there may be a cam or incline 71 beneath the trolley-wire $t$ to guide the wheel 26 as it rises and also to prevent undue blows therefrom. (See Fig. 19.)

That form of the invention shown in Figs. 20 to 24 will now be described. The air-chambers A are formed as in the patent aforesaid or as in my Letters Patent dated the 17th day of January, 1899, and bearing number 617,708, and are covered by a Z-bar 91, a like bar forming the other side of the conduit. The trolley consists of an arm $27^b$, pivoted by an eye 92 on the stud 93, which is carried by the support $29^a$, depending from a vehicle. A plate 94, bolted to the arm $27^b$, fits over the other end of stud 93, and screw 95 or pin 96, which passes through holes in support $29^a$ and stud 93, prevents displacement of the stud. Lugs 97 on the plates 94 coact with the stop 98 to prevent too great a movement of the arms $27^a$. Pull-springs 99, fast to support $29^a$ at one end and to arms $27^b$ at the other, raise the latter. The arm $27^b$ has a bent lever 100 pivoted thereon. Said lever has a friction-roller 101 for coaction with the cams 24, which are here shown as placed on a plate or bar 102 at the bottom of the conduit. Lever 100 is pivoted at or near its bend and is held against the arm 27ᵇ (or plate 94) by the pin 103, fast thereto, and the spring 104, which works between the button 105 on pin 103, and the rim 106 of the socket 107, which incloses the spring.

The conduit-clearer shown in Figs. 34 and 35 consists of the arm 75, reaching under the air-chambers, and its support 76 from the vehicle. The point of arm 75 is ahead of the support, whence it results that any water, mud, slush, &c., is forced out from under the air-chambers and may run up support 76 through the slot 31 onto the street.

Fig. 30 needs no extended description, as the conduit-rails C are or may be like those hereinbefore described.

The conduit and supports therefor (shown in Figs. 37, 38, and 39) consist of the air-chamber rail formed of web 2 and plates 3 and 4, the end-supporting shoes 77, and intermediate shoes 78. The shoe 77 consists of a plate from which rises the standard 79, having a central rib 80. From the standard 79 the lugs 81 project in opposite directions longitudinally of the track, being separated from the rib 82 by a groove 83, adapted to receive the plate 3. This plate 3 may be secured to rib 82, as by bolts and nuts 84. The shoe 78 consists of a plate having ribs 85, between which plate 3 enters and to one (or both) of which it is secured, as by bolts and nuts 84. Both kinds of shoes have overhanging lips 86 to hold down the rail 15 or 14, and a rod 87 is or may be connected to them and to the rails or other part of the track.

The air-chamber rail (shown in Fig. 32) consists of the T-bar 88, riveted to one arm of the T-bar 89. These bars may be calked and cemented to insure air-tightness. A support for the T-bar 89 may be formed of the angle or T bar 90, riveted thereto. Cupped partitions or bulkheads 7ᵃ are riveted in place.

The pocket 8ᵃ (shown in Fig. 33) consists of a tapering tube having threaded ends, one of which engages a threaded hole in the rail C and the other of which receives a cap. The insulator fits the tube and is fast to the trolley-wire. A spring or washer may be used behind the insulator. (Not shown.)

The rails C may be rolled or cast. In the former case the partitions 7 are riveted in or otherwise secured. In the latter case they may be cast with the rail. The pockets 8 may also be cast in one with the rail.

Instead of having the cams 24 consist of straight inclines they may be curved to start or to move the roller 53 more or less gradually at any point of its downward motion.

The operation of the devices shown in Figs. 1, 2, 3, 4, and 5 is as follows: The function of the spring $d$ is to hold the slide 38 up, as in Fig. 4, with the roller (or other form of contact-piece or current-collector) in contact with the trolley-wire $t$ (or other form of conductor) and to hold the arm $g$ of lever $fg$ in contact with the terminal plate 35 of the switch S. In these positions of the parts the current passes through the wheel 26, plate 35, arm $g$, and conductor $h$ to (or from) a motor or a current-controller on the car. Whenever a roller 53 on a slide 38 meets with a cam 24, the roller and the slide are moved downwardly thereby, and the slide, through its slot 51, the pin 52, arm 49, shaft 28, and arm 27, moves the corresponding roller 26 down out of contact with the conductor $t$ and so that said arm 27 and roller 26 pass beneath the partitions or air-chamber ends (or end) 7 without touching the same as the car moves along the track. At the same time the down movement of rod 40 lifts arm $g$ off the plate 35 of switch S and so opens the circuit to the motor at that point, thus avoiding the possibility of a short circuit through the depressed trolley. As there are at least two trolleys on the car and as these are so placed thereon that all of them will not be out of contact with the conductor $t$ at one and the same time, it results that there will be no sparking action when any one of them is moved out of contact with the conductor $t$ or other form of conductor and that the motor is properly supplied with current for the normal operation of the motor, except at such times as the motorman may turn off the current. As the roller 53 passes beyond the dwell 25 and up the cam 24 at that end the spring $d$ returns the parts to normal position, thus closing the switch S and bringing wheel 26 into contact with the conductor $t$. This reëstablishes the electrical connection of the wire $t$ with the motor through that particular trolley which has been operated, and thus supplies current therethrough.

The operation of the modification shown in Figs. 20 to 25 differs but little from the operation above described. These differences will now be indicated. The dotted positions of the parts at the left of Fig. 20 show positions that occur as the right-hand trolley passes under a wall or partition 7, the car moving to the right in Fig. 20. The trolley-arms 27ᵇ are preferably moved down by means of the cams 24 at the bottom of the conduit and are held down for a suitable distance by dwells 25, as shown. The roller 101 of the right-hand trolley-arm 27ᵇ coacts with the left-hand cam 24, while the left-hand trolley-arm 27ᵇ coacts with the right-hand cam-plate 24 to depress their respective trolley-arms. The said cam-plates 24 are not in the same longitudinal plane of the conduit, (vertical,) as is indicated in Fig. 22. Thus the trolley-arms are moved down against the force of the springs 99, which return the trolleys as rollers 101 leave the cams 24 during the progress of the car. What has just been said applies more particularly to the forward or leading trolley-arm 27ᵇ. For the trailing or second trolley-arm I prefer to depress the same by means of the incline 108 under the trolley-wire $t$, this incline being of insulating material and being suitably supported in the air-chamber, as by the wings 109, which reach therefrom to the top of the air-chamber, where they are suitably secured thereto. The insulating incline and wings prevent water from being splashed up against the trolley-wire $t$, which lies above them, all as in my said application of June 13, 1892, is more fully set forth. The incline 108 coacts with the roller 26 to depress the trolley-arm which carries the wheel. The roller 101 of the left-hand trolley in Fig. 20 rides over the cam 24 at the right without operating the trolley-arm. In fact, the lever 100 in this case pivots or turns and so compresses the spring 105, all independently of the motion of the trolley-arm to which said lever is pivoted; but if the car be going to the left in Fig. 20 the left-hand trolley-arm is then operated or depressed by means of its lever 100 and the right-hand cam 24, while the right-hand trolley now is depressed by the incline 108 at the right and its lever 100 pivots or turns independently in the manner just described. It will thus be seen that the leading trolley-arm is depressed by a cam outside of the air-chamber, while the trailing or following trolley-arm is depressed by means of the incline or cam under the trolley-conductor within the air-chamber; also, that the means by which the exterior cams operate the leading trolley-arm turn or pivot out of the way when that trolley-arm becomes the following or trailing trolley and said means reach the cams that operate them during the forward motion of the car whenever the motion of the car is reversed. Thus the car is fitted to run either way upon the one track without being turned around or having its trolleys reversed.

Many other changes in details and combinations may be made without departing from the spirit of this invention, which is not limited to the precise forms shown and described.

Having thus fully described the invention, what I claim as new, and desire to secure by Letters Patent, is—

1. In an electric railway, the combination of a current-collector, a movable carrier therefor, a spring connected with and moving said carrier in one direction, a stationary incline, and connections for moving said carrier against the force of said spring, said connections being operated by said incline, with an air-chamber, and a conductor insulated by said chamber, substantially as described.

2. In an electric railway, the combination of an air-chamber, a conductor insulated thereby, a current-collector, a pivoted carrier therefor, a spring connected with said carrier for moving the same a stationary incline, outside of said chamber, and connections for moving said carrier against the force of said spring, said connections being operated by said incline, substantially as described.

3. In an electric railway, the combination of a current-collector, a pivoted carrier therefor, and a continuous unbroken conductor leading from the collector along the carrier and leaving the same in line with the axis of motion thereof, substantially as described.

4. In an electric railway, the combination of a current-collector, a shaft having an arm carrying the collector, and a continuous unbroken conductor from the collector passing along the arm and shaft and leaving the latter in line with the axis thereof, substantially as described.

5. In an electric railway, the combination of a current-collector, a pivoted carrier therefor, a slide operating the carrier, a rod connected directly with the slide, a spring moving the rod in one direction, and a stationary cam to move the slide in the other direction, substantially as described.

6. In an electric railway, the combination of a current-collector, a pivoted carrier therefor, a slide operating the carrier, a rod connected directly to the slide, a spring moving the rod and slide one way, a stationary cam for moving the slide the other way, a switch operated by the rod, and a conductor leading from the collector to the switch, substantially as described.

7. In an electric railway, the combination of a current-collector, a pivoted carrier therefor, a slide operating the carrier, a rod and spring moving the slide one way, a stationary cam for moving it the other way, a conductor from the collector to the switch and leaving said carrier in line with its axis of motion, and a switch operated by said rod, substantially as described.

8. In an electric railway, the combination of a current-collector, a shaft having an arm carrying said collector, a slide rocking said shaft, a rod and spring moving said slide in one direction, a stationary cam for moving it the other way, a conductor passing along said arm and shaft and leaving the latter axially thereof at one end, and a switch operated by the rod, substantially as described.

9. In an electric railway, the combination of a current-collector, a shaft having an arm at one end thereof to carry the collector, and a continuous unbroken conductor from the collector leaving the shaft axially thereof at the other end thereof, substantially as described.

10. In an electric railway, the combination of the contact-piece 26, the hollow shaft 28 having a hollow arm 27 carrying said piece, the slide 38, the rod 40 connected directly to slide 38, the spring $d$ operating the rod 40, the stationary cam 24 having a dwell 25, and a conductor passing along the hollow of arm 27 and hollow of shaft 28 and leaving the latter axially at one end thereof, substantially as described.

11. In an electric railway, the combination of a contact-piece 26, the hollow shaft 28 having a hollow arm 27 at one end thereof to carry the said piece, and a continuous unbroken conductor leading from the said piece and through the hollow of arm 27 and the hollow of shaft 28, leaving the latter axially thereof at the other end thereof, substantially as described.

12. In an electric railway, the combination of a hollow journaled shaft, a hollow arm on the shaft formed of two parts secured together one of which is integral with the shaft and arranged to support the current-collector, the collector supported thereby, and a continuous unbroken conductor in said hollow arm and shaft, substantially as described.

13. In an electric railway, the combination of a hollow journaled shaft, an arm at each end of the shaft integral therewith, a plate secured to one of said arms and forming a hollow chamber therewith, a current-collector carried by said arm and plate, a continuous unbroken conductor in said hollow arm and shaft, and means acting on the other arm to rock the shaft, substantially as described.

14. In an electric railway, the combination of a support composed of two L-shaped pieces, a shaft journaled therein and having two arms, a current-collector carried by one of said arms, a slide between the L-shaped pieces and operating the second arm of the shaft, and means operating said slide, substantially as described.

15. In an electric railway, the combination of a hollow shaft having two arms, a current-collector carried by one of said arms, a support consisting of two L-shaped pieces arranged to receive a slide and the second arm of the shaft between them, and each having a semicylindrical groove to receive the shaft, a slide within said support, and connected with the second arm of the shaft, means operating the slide, and a conductor leading from the collector through the hollow shaft, substantially as described.

16. In an electric railway, the combination of a shaft having two arms, a current-collector carried by one of said arms, a support composed of two L-shaped pieces each having a semicylindrical groove for the shaft, and arranged to receive a slide and the other arm of the shaft between them, a slide within the support and connected with the said second arm, a rod and spring moving the slide in one direction, and a stationary cam moving it the other way, substantially as described.

17. In an electric railway, the combination of a hollow shaft having two arms, a current-collector or contact-piece carried by one of said arms, a support consisting of two L-shaped pieces arranged to receive a slide and the second arm of the shaft between them and each having a semicylindrical groove for the shaft, a slide within the support and operating the said second arm of the shaft, a rod and spring moving the slide one way, a conductor from said contact-piece lying within the shaft, and means moving the slide against the spring, substantially as described.

18. In an electric railway, the combination of a shaft having two arms, a current-collector carried by one arm, a support consisting of two L-shaped pieces recessed to receive a slide and the second arm of the shaft, a slide within said support and operating the second arm of the shaft, a switch, a conductor from the collector to the switch, and means for operating the switch and slide, substantially as described.

19. In an electric railway, the combination of a hollow shaft having two arms, a current-collector carried by one of the arms, a support consisting of two L-shaped pieces recessed to receive a slide and the second arm of the shaft and each having a semicircular groove for the shaft, a slide within said support and operating the said second arm, a switch, a conductor from the collector passing along the hollow of the shaft and to the switch, and means for operating the switch and the slide, substantially as described.

20. In an electric railway, the combination of shaft 28, its arms 27 and 49, the trolley-wheel 26, a support composed of two L-shaped pieces recessed to receive a slide and arm 49, the slide 38 within the support and operating the arm 49, and means to operate the slide, substantially as described.

21. In an electric railway, the combination of the hollow shaft 28, the hollow arm 27 thereon, the arm 49 also thereon, the trolley-wheel 26 carried by the arm 27, a support consisting of two L-shaped pieces recessed to receive a slide and the arm 49 and having the grooves 42 and 47, the slide 38 within the support and operating the arm 49, means for operating said slide, and the conductor 33 leading through the hollow arm 27 and hollow shaft 28, substantially as described.

22. In an electric railway, the combination of a shaft 28, its arms 27 and 49, the trolley-wheel 26 carried by the arm 27, a support consisting of two L-shaped pieces recessed to receive a slide and the arm 49, and having the semicylindrical grooves 42 and 47, the slide 38 within the support and operating said arm 49, a rod 40 and spring $d$ moving said slide one way, and a stationary cam moving it the other way, substantially as described.

23. In an electric railway, the combination of a hollow shaft 28 having two arms 27 and 49, the trolley-wheel 26 carried by arm 27, a support consisting of two L-shaped arms recessed to receive a slide and the arm 49 and having semicylindrical grooves 42 and 47, a slide 38 within the support and operating the arm 49, a rod 40 and spring $d$ moving the slide in one way, means for moving the slide the other way, and a conductor leading from the wheel 26 along the hollow shaft, substantially as described.

24. An air-chamber conduit-rail composed of a horizontal top web, plates of unequal length extending downwardly therefrom, a guide-flange forming an angle with the shorter plate, and a foot flange or flanges on the longer plate, substantially as described.

25. An air-chamber conduit-rail composed of a horizontal top web, plates of unequal length extending downwardly therefrom, a guide-flange on the shorter plate in the plane of the top web and a foot flange or flanges on the longer plate, substantially as described.

26. An air-chamber conduit-rail composed of a horizontal top web, plates of unequal length extending downwardly therefrom, a guide-flange forming an angle with the shorter plate, and a foot flange or flanges on the longer plate, said parts all being integral, substantially as described.

27. An air-chamber conduit-rail composed of a horizontal web, plates of unequal length extending downwardly therefrom, a guide-flange on the shorter plate in the plane of the web, and a foot flange or flanges on the longer plate, all said parts being integral with one another, substantially as described.

28. An air-chamber conduit-rail composed of a horizontal top web, plates of unequal length extending downwardly from the web, a guide-flange making an angle with the shorter plate, a foot flange or flanges on the longer plate, air-chamber ends, and a cam forming a continuation of the guide-flange adjacent the said ends, substantially as described.

29. An air-chamber conduit-rail composed of a horizontal top web, plates of unequal length extending downwardly therefrom, a guide-flange on the shorter plate in the plane of the said web, a foot flange or flanges on the longer plate, air-chamber ends, and cams adjacent the said ends and forming a continuation of the said guide-flange, substantially as described.

30. An air-chamber rail composed of a horizontal top web, plates of unequal length extending downwardly therefrom, a guide-flange forming an angle with the shorter plate, a foot flange or flanges on the longer plate, all said parts being integral, air-chamber ends, and cams forming a continuation of the guide-flange, and placed adjacent the said ends, substantially as described.

31. An air-chamber conduit-rail composed of a horizontal top web, plates of unequal length extending downwardly therefrom, a guide-flange in the plane of the web on the shorter plate, a foot flange or flanges on the longer plate, all said parts being integral with each other, air-chamber ends, and cams forming a continuation of the guide-flange and placed adjacent the said ends, substantially as described.

32. The combination of an air-chamber, a trolley-wire therein, a pocket at the side of the chamber, and insulating-supports for the wire carried by the pocket, substantially as described.

33. The combination of an air-chamber, a trolley-wire therein, a pocket extending the depth of the chamber at the side thereof, and a support for the wire carried by said pocket, substantially as described.

34. The combination of the air-chamber rail C, the pocket 8 at the side thereof, the trolley-wire t therein, and the support for the wire carried by the pocket, substantially as described.

35. The combination of an air-chamber conduit-rail, a base or supporting flange therefor, a wire-carrier extending from the top of the air-chamber through the said flange, the trolley-wire, and the wire passing through the carrier, substantially as described.

36. The combination of the air-chamber rail, the flange 5 thereof, the wire-carrier 60, extending through the flange 5, the trolley-wire t and the feed-wire 9 passing through the carrier 60, substantially as described.

37. The combination of an air-chamber conduit, the trolley-wire therein and the contact-device guide beneath the wire at one or both ends thereof, substantially as described.

38. The combination of the hollow shaft forming a pivot, a hollow arm thereon, a contact device carried by said arm, and a continuous unbroken conductor from the contact device passing through the arm and shaft, substantially as described.

39. The combination of a hollow shaft, forming a pivot, a coiled spring supported at one end thereof by the shaft, a contact device supported by the other end of the spring, and a conductor from the contact device passing through the spring and the shaft, substantially as described.

In testimony that I claim the foregoing as my invention I have signed my name, in presence of two witnesses, this 21st day of October, 1893.

RICHARD W. BARKLEY.

Witnesses:
O. A. CAMPBELL,
C. A. BRODEK.